(12) United States Patent
Ikeda (10) Patent No.: US 6,435,322 B1
(45) Date of Patent: Aug. 20, 2002

(54) DUO TWO LEADING TYPE DRUM BRAKE DEVICE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/563,415

(22) Filed: May 3, 2000

(30) Foreign Application Priority Data

May 7, 1999 (JP) .......................................... 11-127663

(51) Int. Cl.$^7$ ................................................ F16D 51/00
(52) U.S. Cl. ...................................... 188/326; 188/79.51
(58) Field of Search .......................... 188/74, 79.51, 188/325, 326, 196 V, 196 R, 196 B, 196 BA, 196 D, 79.62, 79.54, 79.64, 79.56, 79.58

(56) References Cited

U.S. PATENT DOCUMENTS

| | | | | |
|---|---|---|---|---|
| 3,246,723 A | * | 4/1966 | Pauwels | 188/196 BA |
| 4,401,197 A | * | 8/1983 | Bohla et al. | 188/326 X |
| 4,416,356 A | * | 11/1983 | Osborne | 188/326 |
| 5,062,504 A | * | 11/1991 | Yamamoto | 188/79.56 |
| 5,275,260 A | * | 1/1994 | Evans et al. | 188/79.64 |
| 5,913,390 A | * | 6/1999 | Hostetler | 188/79.51 |
| 5,924,529 A | * | 7/1999 | Ikeda et al. | 188/325 X |
| 6,065,571 A | * | 5/2000 | Ikeda | 188/325 X |
| 6,082,505 A | * | 7/2000 | Asai et al. | 188/79.54 |

FOREIGN PATENT DOCUMENTS

| | | |
|---|---|---|
| JP | 61-14371 | 4/1986 |
| JP | 7-208518 | 8/1995 |
| JP | 8-312702 | 11/1996 |

* cited by examiner

*Primary Examiner*—Christopher P. Schwartz
*Assistant Examiner*—Melanie Torres
(74) *Attorney, Agent, or Firm*—Liniak, Berenato, Longacre & White (57) ABSTRACT

A small diameter duo two leading type drum brake that can mount a built-in parking brake mechanism. The brake has a link mechanism that includes a pivot lever that is rotatably and pivotally supported at a central region of a first brake shoe. A first strut is provided between a first end of a pivot lever and a second brake shoe. A second strut is substantially parallel to the first strut and is provided between the second end of the pivot lever and the second brake shoe. A parking brake actuator is provided to activate the link mechanism to open the pair of first and second brake shoes. A service brake actuator has an automatic shoe clearance adjustment device and one of the first and second struts has an automatic parking stroke adjustment device.

12 Claims, 13 Drawing Sheets

DUO TWO LEADING TYPE DRUM BRAKE DEVICE

BACKGROUND OF THE INVENTION

This invention relates to a duo two leading type drum brake device, hereinafter referred to simply as a drum brake device, with a built-in parking brake mechanism. More specifically, this invention relates to a drum brake device that is suitable for use as a rear brake of a commercial automotive type vehicle.

Figure 13:
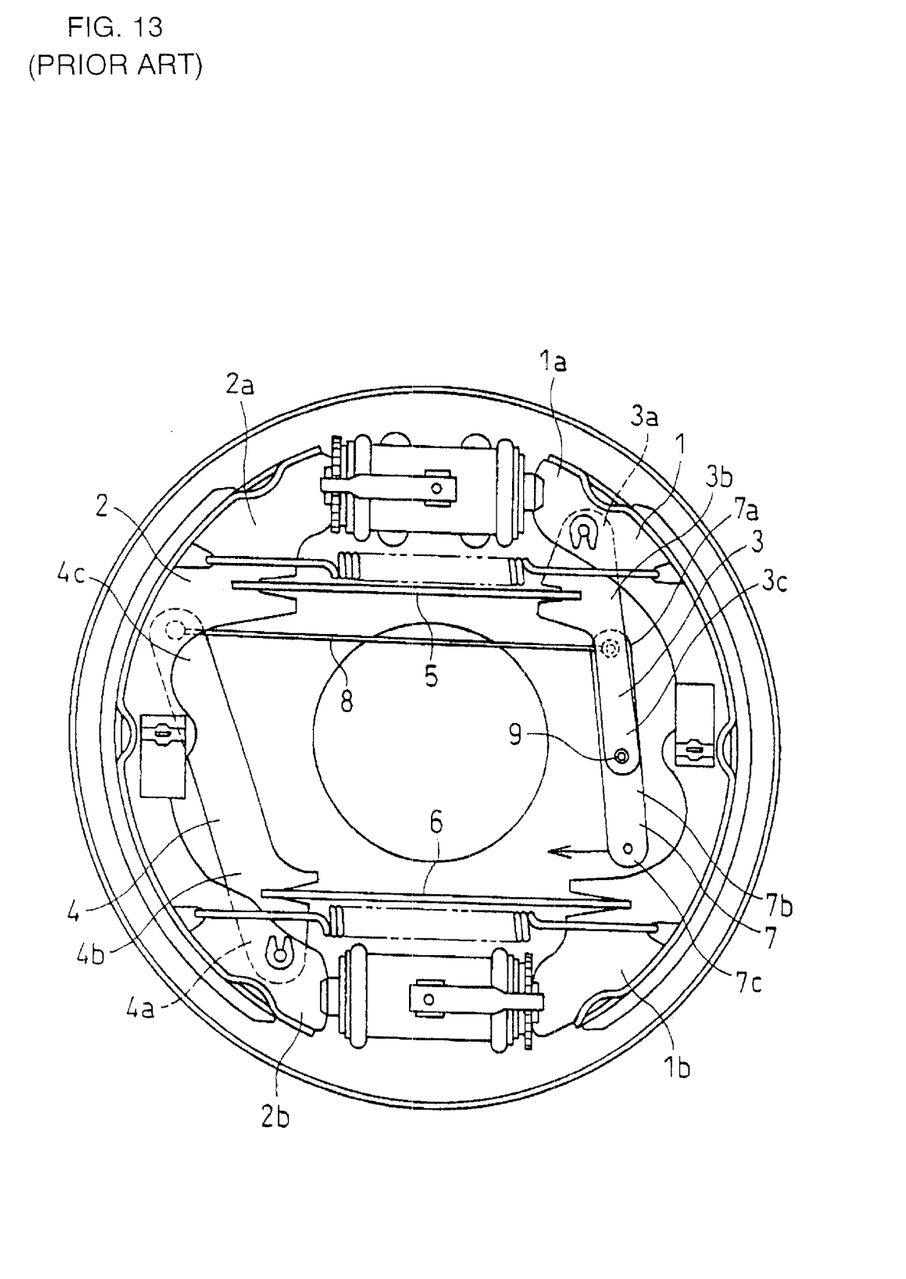
FIG. 13 is a plan view of a conventional drum brake with a built-in parking brake mechanism.

A conventional drum brake device is disclosed in Japanese Patent Publication No. 61-14371. Referring to FIG. 13, Japanese Patent Publication No. 61-14371 illustrates a parking brake operation mechanism in which a pair of brake shoes function as leading shoes for braking operation regardless of the rotational direction of a brake drum.

In the conventional parking brake mechanism, an upper end 3a of a first lever 3 is pivotally supported at an upper side 1a of a first brake shoe 1 and a lower end 4a of a second lever 4 is pivotally supported at a lower side 2b of a second, or other, brake shoe 2. An upper strut 5 is provided between a central region 3b of the first lever 3 and an upper side 2a of the second brake shoe 2. A lower strut 6 is provided between a central region 4b of the second lever 4 and a lower side 1b of the first brake shoe 1. A central region 7b of a brake lever 7 is pivotally supported at a lower end 3c of the first lever 3 at a pivot point 9. A connecting means 8 connects an upper end 4c of the second lever 4 and an upper end 7a of the brake lever 7. Also, a lower end 7c of the brake lever 7 is pulled toward the second lever 4 side to activate operation of the parking brake.

The structure of the above-described conventional parking brake has numerous drawbacks. For example, the conventional parking brake requires additional parts, such as, for example, the first lever 3, the second lever 4, and the connecting means 8 besides the upper strut 5, the lower strut 6, and the brake lever 7. The requirement of the above-listed additional parts makes the structure of the parking brake device more complex, as well as increases the costs associated with manufacturing.

Furthermore, because the components of the conventional parking brake are arranged in the central region of the brake, the conventional parking brake may easily be redesigned for a large diameter brake such as is found in a heavy duty vehicle. However, redesigning the conventional parking brake for a small diameter brake such as is found in a medium duty vehicle is difficult to accomplish because the brake lacks sufficient space for mounting a parking brake mechanism in the central region of the drum brake. Because of the problem of providing sufficient space to mount all of the necessary devices, a duo two leading type drum brake with a built in conventional parking brake mechanism is limited to use for a large diameter brake and is rendered impracticable for a small diameter brake.

Also, the conventional parking brake does not use an automatic parking stroke adjustment mechanism. Thus, a parking brake stroke increases as a lining wears. In addition, the limited space available in the parking brake renders any attempt of providing an automatic parking stroke adjustment mechanism in one of the upper or lower struts 5, 6 undesirable.

Moreover, because the connecting means 8 is positioned on an operation path of the parking brake mechanism and three levers, specifically, the first and second levers 3, 4 and brake lever 7, are pivotally supported by a pin (not identified by a reference number) assembling and taking apart the conventional parking brake become extremely troublesome.

SUMMARY OF THE INVENTION

An object of this invention is to overcome the drawbacks of the above-described conventional parking brake.

Another object of this invention is to provide a duo two leading type drum brake device with a parking brake mechanism having a simple structure and lower cost.

Yet another object of this invention is to provide a duo two leading type drum brake device having an automatic parking stroke adjustment mechanism that provides the driver with improved operational feeling.

A first aspect of this invention is a duo two leading type drum brake device comprising a back plate, a pair of service brake actuators, and a pair of brake shoes. The brake shoes face each other on the back plate and each pair of adjacent ends has one of the service brake actuators in between, wherein a pivot lever is rotatably supported longitudinally at a central region of one of the brake shoes. One strut is provided between one end of the pivot lever and the other brake shoe, while another strut is positioned to be parallel to the one strut and is provided between the other ends of the pivot lever and the other brake shoe.

A parking brake actuator comprises a brake lever and, a link mechanism includes said pivot lever and a pair of said struts. Because the parking brake actuator is provided so as to activate said link mechanism, the brake device with a built-in parking brake mechanism of this invention can be designed for use for a small diameter brake.

The parking brake actuator, upon operation of the parking brake, spreads open the pair of brake shoes through an engagement with the link mechanism. An automatic shoe clearance adjustment device, which extends itself in response to an excessive opening of each brake shoe upon operation of service brake and automatically adjusts a clearance between a brake drum and each brake shoe, is provided in each service brake actuator. Also, an automatic parking stroke adjustment device, which extends itself in response to an excessive opening of both brake shoes and automatically adjusts an amount of parking brake actuator stroke, is provided on at least one of the struts.

A second aspect of this invention is to provide a duo two leading type drum brake device as described above, wherein each adjustment convergence value of the automatic shoe clearance adjustment and automatic parking stroke adjustment devices are set to support each adjacent end of both brake shoes by an anchor of the service brake actuator when the service brake is not being operated.

A third aspect of this invention is to provide a duo two leading type drum brake device as described above, wherein the automatic shoe clearance adjustment device has a built-in screw mechanism having a bolt and a nut and is housed in a cylinder of the service brake actuator.

A fourth aspect of this invention is to provide a duo two leading type drum brake device as described above, wherein the screw mechanism has a reversible screw threaded connection where the bolt and nut are both rotatable and operation of the automatic shoe clearance adjustment device features an exponential incremental characteristic or curve.

A fifth aspect of this invention is to provide a duo two leading type drum brake device as described above, wherein the automatic shoe clearance adjustment device uses a ratchet mechanism having a retrofit lever mounted outside of the cylinder body of the service brake actuator and a gear.

A sixth aspect of this invention is to provide a duo two leading type drum brake device as described above, wherein operation by the automatic shoe clearance adjustment device of the ratchet mechanism of the lever and the gear, features a linear incremental characteristic function.

A seventh aspect of this invention is to provide a duo two leading type drum brake device as described above, wherein the automatic parking stroke adjustment device has a linear incremental adjusting function providing a screw mechanism of a bolt and a nut.

An eighth aspect of this invention is to provide a duo two leading type drum brake device as described above, wherein the automatic parking stroke adjustment device has a one-shot adjusting function providing teeth formed on a bell crank lever and elements that engage the teeth.

A ninth aspect of this invention is to provide a duo two leading type drum brake device as described above, wherein the parking brake actuator activates parallel to the back plate.

A tenth aspect of this invention is to provide a duo two leading type drum brake device as described above, wherein the parking brake lever operates at a right angle relative to the back plate.

An eleventh aspect of this invention is to provide a duo two leading type drum brake device as described above, wherein a protuberance is integrally formed by pressing longitudinally on a central region of the pivot lever or the shoe web. The protuberance is rotatably pivotally supported in an associated hole provided either on one of either the brake shoe or the pivot lever (without the protuberance).

A twelfth aspect of this invention is to provide a duo two leading type drum brake device as described above, wherein the protuberance on the central region of the pivot lever or the brake shoe is hollow and formed as a burr with a press, wherein a brake shoe freely holds the pin piercing the hollow protuberance.

Accordingly, the number of parts necessary for the parking brake mechanism of this invention is reduced, thereby simplifying the structure and providing a lightweight device at a lower cost. Because the parts of this invention are not concentrated in the brake center, the automatic parking stroke adjustment device may easily be arranged in the brake. Further, the parking brake stroke does not vary even if the lining wears out, which provides the driver a comfortable feeling while operating the parking brake.

By setting the amount of adjustment of the automatic shoe clearance adjustment and automatic parking stroke adjustment devices so that the fixed anchor of the service brake actuator supports each adjacent end of both brake shoes when not in operation, the configuration of this invention prevents dragging or biting of the brake shoes while driving. The automatic shoe clearance adjustment device may have either incremental or one shot adjusting capabilities. Thus, the invention provides a wide range of applications and makes it possible to commonly use the parts in different kinds of brake devices.

Furthermore, this invention provides a parking brake device that is easy to assemble and disassemble.

BRIEF DESCRIPTION OF THE DRAWINGS

These and other objects and advantages of this invention will become more fully apparent from the following detailed description when read in conjunction with the accompanying drawings, with like reference numerals indicating corresponding parts throughout, wherein.

DETAILED DESCRIPTION OF PREFERRED EMBODIMENTS

A first embodiment of this invention will be explained below with reference to FIGS. 1–6.

Figure 1:
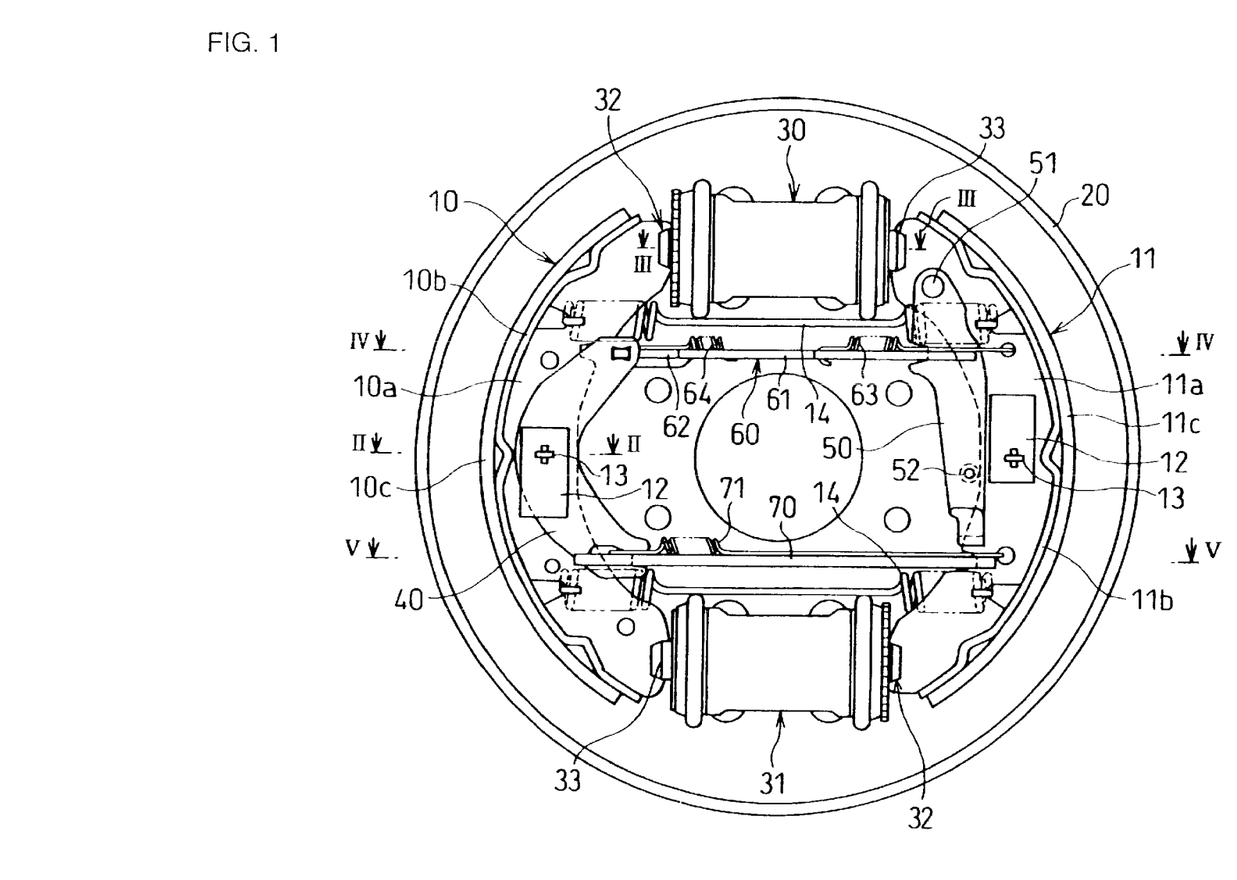
FIG. 1 is a plan view of a duo two leading type drum brake device with respect to a first embodiment according to this invention.

FIG. 1 shows a plan view of the drum brake device. A pair of brake shoes 10, 11 include shoe webs 10a, 11a, shoe rims 10b, 11b, and linings 10c, 11c. The shoe webs 10a, 11a and the shoe rims 10b, 11b are integrated to form a T-shape in cross-section. The linings 10c and 11c are fixed on the shoe rims 10b and 11b, respectively.

The brake shoes 10, 11 are positioned on a back plate 20 such that the brake shoes 10, 11 face each other with a well known shoe hold mechanism, which includes a plate spring 12 and a pin 13.

A pair of service brake actuators 30, 31, also functioning as anchors and vertically facing each other, are respectively provided between upper and lower adjacent ends of brake shoes 10, 11. The service brake actuators 30, 31, each have two built-in pistons 32 and 33. Both adjacent ends of each brake shoe 10 and 11 engage the pistons 32 and 33, which may be urged to be compressed by a spring force of return springs 14, 14 extended between both brake shoes 10, A central region of a pivot lever 40 is rotatably and pivotally superposed on a left side of the shoe web 10a of the brake shoe 10. A brake lever 50 is rotatably and pivotally supported by a pin 51 at a right side of an upper portion of the shoe web 11a of the brake shoe 11.

A first strut 60 and a second strut 70 are positioned in a substantially parallel relationship to each other and function as parts of a link mechanism. The first strut 60 is provided between an upper end of the pivot lever 40 and a central region of the brake lever 50 which is pivotally mounted on the shoe web 11a of the brake shoe 11, while the second strut 70 is provided between a lower end of the pivot lever 40 and a lower portion of the brake shoe 11. This invention is designed to facilitate combining the parking brake mechanism using the link mechanism, which includes the pair of struts 60, 70, in combination with the pivot lever 40. Each part is explained next.

Pivot Structure of the Pivot Lever

Figure 2:
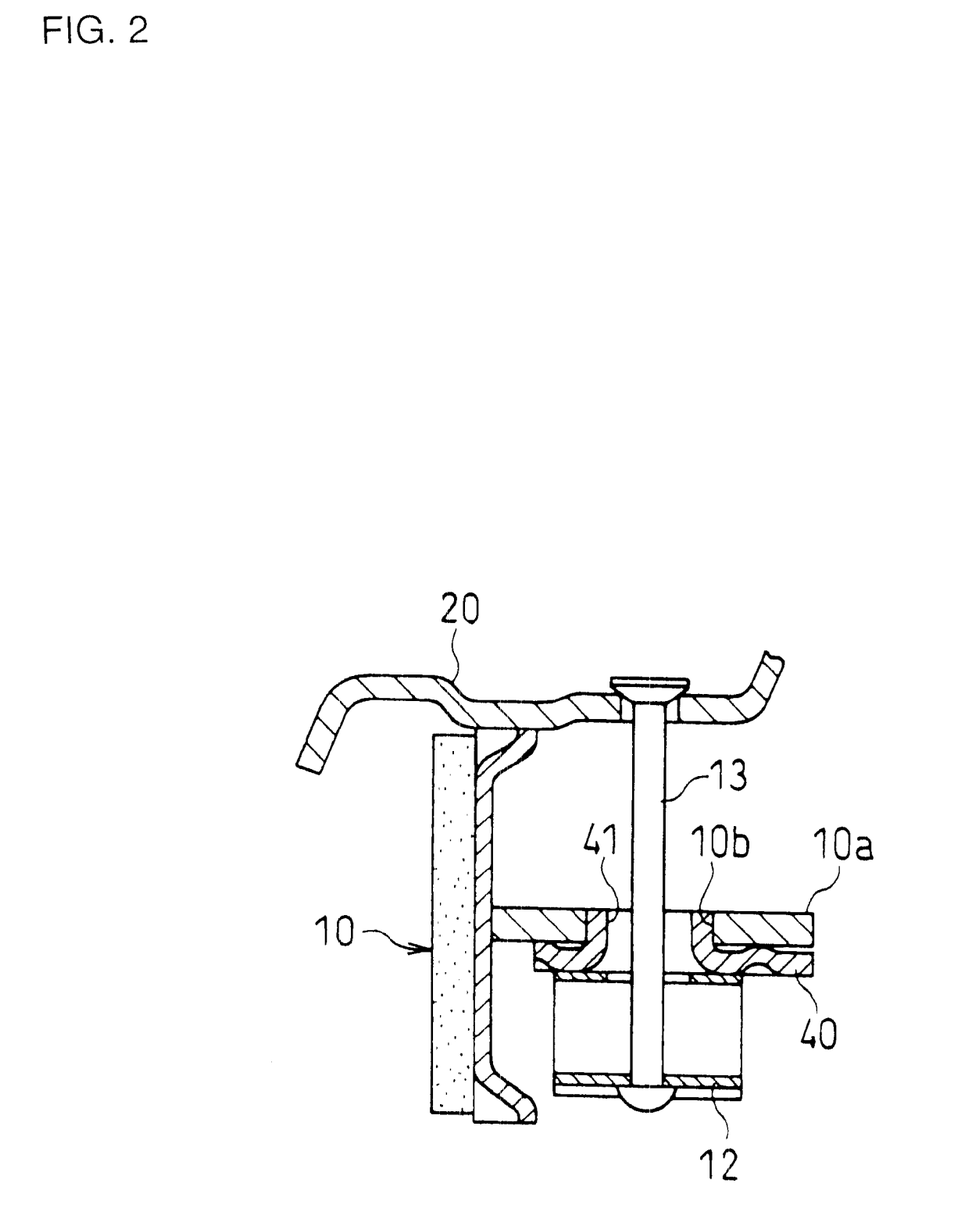
FIG. 2 is a cross-sectional view of the drum brake device illustrated in FIG. 1 taken along section line II—II.

As shown in FIG. 2, in order to hold the brake shoe 10 and the pivot lever 40 on the back plate 20, a hollow protuberance 41 is integrally formed, such as, for example, by a press, on the central region of the pivot lever 40 to be rotatably and pivotally supported by a vertical hole 10d formed in the shoe web 10a of the brake shoe 10. The pin 13, with an end freely piercing through the hollow protuberance 41 from the back plate 20 side, is temporary fixed on the plate spring 12 mounted on the pivot lever 40.

As a pivot structure in combination with the brake shoe 10 and the pivot lever 40, the hollow protuberance may be formed on the shoe web 10a with a pivot hole formed in the pivot lever 40. Alternatively, instead of the above-described pivot structure with the hollow protuberance and a hole, an additional sleeve with a flange (not shown) may be used to pivot the brake shoe 10 and the pivot lever 40. Furthermore, the plate spring 12 and pin 13, or shoe hold mechanisms, may be located at different positions, and a solid protuberance or well known additional pin may be used to pivot the brake shoe 10 and the pivot lever 40.

Service Brake Actuator

Figure 3:
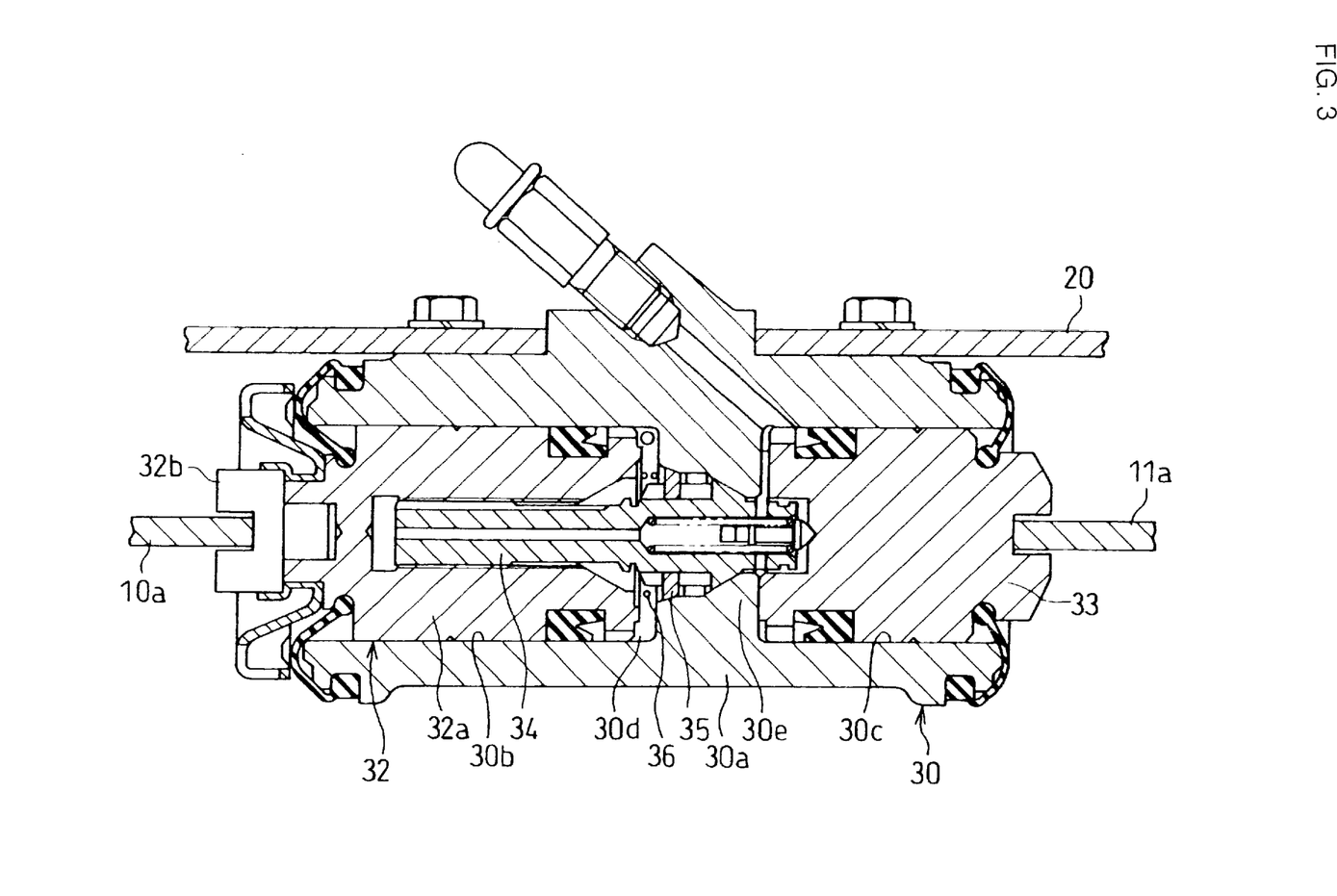
FIG. 3 is a cross-sectional view of the drum brake device illustrated in FIG. 1 taken along section line III—III.

Since both service brake actuators 30, 31 are structurally the same, the explanation provided below is made with reference only to service brake actuator 30 to avoid redundancy. Referring to FIG. 3, it can be seen that a pair of pistons 32, 33 are slidably housed in cylinder holes 30b,30c of cylinder body 30a. A fluid channel is configured so that both pistons 32, 33 may either stroke in or out to either supply or exhaust a fluid in a fluid chamber 30d located between the pistons 32, 33. In addition, one piston 32 has a body 32a and a head 32b, each of which relatively rotatably fit together.

The service brake actuator 30 has a built-in automatic shoe clearance adjustment device with exponential incremental adjusting function comprising an adjustment shaft 34 installed between the piston 32 and a partition 30e behind the cylinder hole 30b, a driving ring 35, and a spring 36. The adjustment operation of the automatic shoe clearance device is explained in detail below.

The automatic shoe clearance adjustment device, as described above, is configured with a screw mechanism that includes an adjustment shaft 34, which is illustrated as a bolt, and a driving ring 35, which is illustrated as a nut. The adjustment shaft 34 and driving ring 35 are primary members of the screw mechanism. While a back end of the adjustment shaft 34 is supported by the partition 30e to also function as an anchor, a bottom end of the piston 33 is supported by the partition 30e to also function as an anchor.

First Strut

Figure 4:
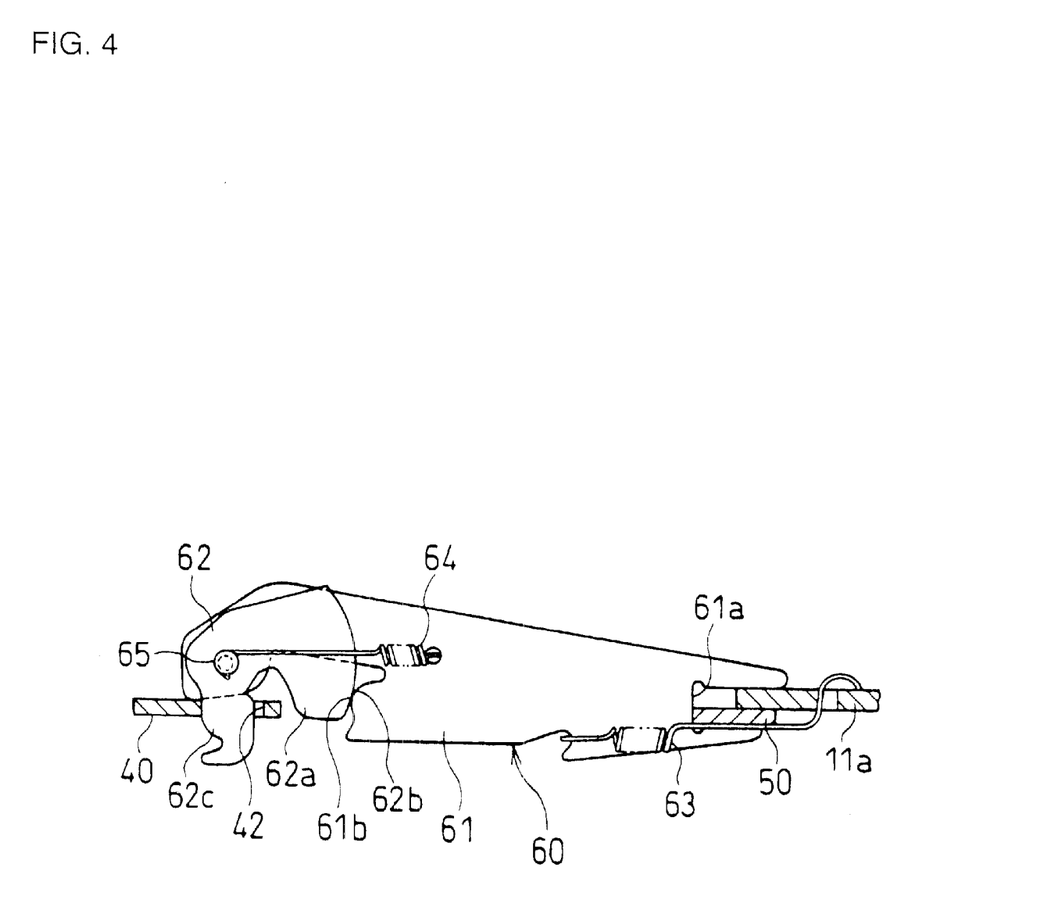
FIG. 4 is a cross-sectional view of the drum brake device illustrated in FIG. 1 taken along section line IV—IV.

As shown in FIGS. 1 and 4, the first strut 60 has a one-shot automatic parking stroke adjustment function and comprises a plate 61, a bell crank lever 62, two springs 63, 64, and a pin 65. The shoe web 11a and the brake lever 50, which will be described in detail below, are received in a notched groove 61a formed on the right side of the plate 61 wherein a bottom of the notched groove 61a abuts against the brake lever 50.

Small teeth 61b are formed in a central region of the plate 61. The central region of the bell crank lever 62 is rotatably and pivotally supported by the pin 65 at the left side of the plate 61. Further, the pin 65 is movable within an elongate hole on the left side of the plate 61 along the longitudinal direction of the plate surface of the plate 61. Small teeth 62b formed on a peripheral surface of a sector or fan-shaped arm 62a at one side of the bell crank lever 62 engage the small teeth 61b of the plate 61.

In addition, a cam arm 62c having a cam surface freely fits within, that is, with a little gap, a rectangle hole 42 formed on an upper portion of the pivot lever 40, as illustrated in FIG. 1. An anti-rattle spring 63 extends between the shoe web 11a and the plate 61, and the spring 64 extends between the plate 61 and the pin 65.

In FIG. 1, the anti-rattle spring 63 applies a spring force in a counterclockwise direction with a pivot section (pin 51) of the shoe web 11a as the fulcrum to the brake lever 50 via the first strut 60. The spring force from the anti-rattle spring 63 prevents vibration of the brake lever 50 and the first strut 60. In addition, a mounting load of the above-mentioned springs 63, 64 is determined so that the load on the anti-rattle spring 63 is higher than the load on the spring 64.

Second Strut

Figure 5:
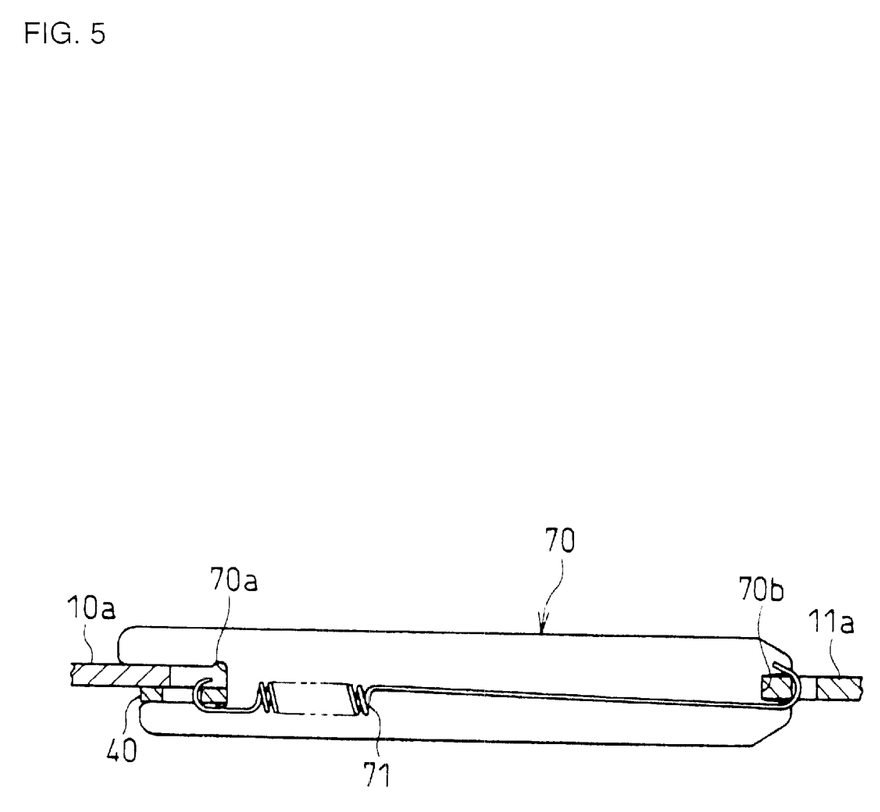
FIG. 5 is a cross-sectional view of the drum brake device illustrated in FIG. 1 taken along section line V—V.

As shown in FIGS. 1 and 5, the second strut 70 extends between a lower portion of the pivot lever 40 and a lower portion of the brake shoe 11. The second strut 70 receives the shoe web 10a and the lower portion of the pivot lever 40 by its notched groove 70a. The bottom of the notched groove 70a abuts against the pivot lever 40. A bottom of a notched groove 70b formed on the right side of the second strut 70 abuts against the shoe web 11a. A spring 71 extending between the pivot lever 40 and the shoe web 11a urges both the pivot lever 40 and the second strut 70 in a direction so that the second strut 70 abuts against the shoe web 11a, thereby preventing a vibration of the pivot lever 40 and the second strut 70.

Parking Brake Actuator

The brake lever 50 constituting a parking brake actuator is positioned between the first strut 60 and the brake shoe 11 to activate the link mechanism. As discussed above, the link mechanism comprises the pivot lever 40 and pair of struts 60, 70. That is, the brake lever 50 shown in FIG. 1 is rotatably and pivotally supported on the brake shoe 11 with the pin 51. A stopper 52 formed on the brake lever 50 abuts against the inner end surface of the shoe web 11a to restrict a retract position of the lever 50.

A parking brake cable (not shown) is connected to a free end of the brake lever 50 and is pulled to the left in FIG. 1. The brake lever 50 rotates and engages the link mechanism having the first strut 60, pivot lever 40, and second strut 70 to spread the brake shoes 10, 11 open or apart.

Service Brake Operation

In FIG. 1, when the service brake actuators 30, 31 are pressurized to open or spread apart the upper and lower ends of both brake shoes 10, 11 against the force of the return springs 14, 14, the linings 10c, 11c frictionally engage a brake drum (not shown). Accordingly, if the brake drum is rotating clockwise, each adjustment shaft 34 of each piston 32 functions as an anchor. Also, if the brake drum is rotating counterclockwise, each piston 33 functions as an anchor. At this time, both brake shoes 10, 11 have a self-servo property regardless of the rotational direction of the brake drum, thereby operating as a two leading type drum brake.

Parking Brake Operation

In FIG. 1, when the free end of the brake lever 50 is pulled toward the left side in the drawing figure, the brake lever 50 rotates clockwise with the pin 51 as the fulcrum, thereby moving the first strut 60 to the left. Then, an operation force of the first strut 60 is transmitted to the upper portion of the pivot lever 40, and the pivot lever 40 is rotated counterclockwise with the hollow protuberance 41 or pivot section of the shoe web 10a acting as the fulcrum. Also, the lower end of the pivot lever 40 pushes the lower portion of the brake shoe 11 via the second strut 70. Simultaneously, a further application force causes the brake lever 50 to give a reaction force, via the pin 51, onto the upper portion of the brake shoe 11 with a point of abutment with the first strut 60.

Accordingly, the brake shoe 10 opens due to the operation force from the pivot point of the pivot lever 40 and frictionally engages the brake drum, while the brake shoe 11 opens due to the operation force of the second strut 70 and the pin 51 and frictionally engages the brake drum.

As the operation of both brake shoes 10, 11 is the same as described above with respect to operation of the service brake, explanation of such is omitted herefrom to avoid redundancy.

Operation of an Automatic Shoe Clearance Adjustment

A detailed description of the automatic shoe clearance adjustment mechanism is disclosed in Japanese Patent Application Laid Open No. 7-208518 (U.S. Pat. No. 5,713,437), which is incorporated herewith by reference. Furthermore, the explanation of the automatic shoe clearance adjustment mechanism herein is made only with respect to one of the brake shoes, that is brake shoe 10, with reference to FIGS. 1 and 3.

If the service brake is activated after the lining 10c of the brake shoe 10 wears out and the brake drum (not shown) is rotating counterclockwise, the piston 32 and the adjustment shaft 34 advance together. The adjustment shaft 34 is connected to the piston 32 by a non-reversible screw thread connection in which the pitch and flank angles of the thread and the coefficient of friction between the mating surfaces of the threads are such that an axially applied force between the members cannot cause relative rotation therebetween. The driving ring 35, which is connected to the adjustment shaft 34 with a horizontal gap in between by a reversible screw thread connection in which the pitch and flank angles of the thread and the coefficient of friction between the mating surfaces of the threads are such that an axially applied force between the members can cause relative rotation therebetween, slips upon exceeding the gap due to a spring force of the spring 36.

Upon release of the braking operation, the piston 32 and adjustment shaft 34 return to their original position. At this time, if the amount of the above-described return movement exceeds a length of the horizontal gap between the driving ring 35 and adjustment shaft 34, the driving ring 35 is prevented from rotating due to a clutch engagement with the partition 30e. Then, the adjustment shaft 34 rotates, and a back end of the shaft 34 returns until making a clutch engagement with the partition 30e. Rotation of the adjustment shaft 34 causes the shaft 34 to screw out of the body 32a of the piston 32 to automatically adjust the clearance between the brake drum and bake shoe 10.

Figure 6:
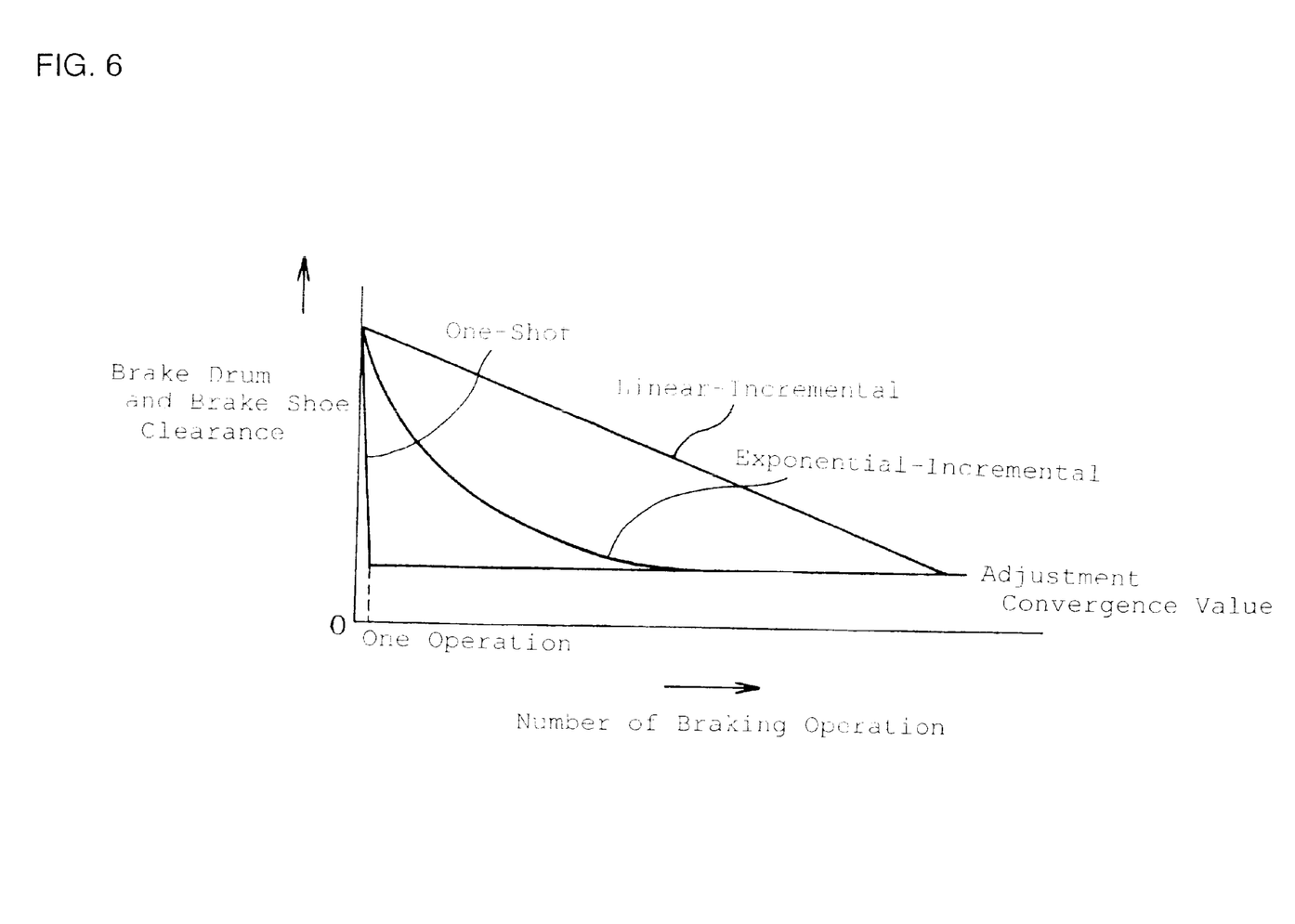
FIG. 6 is a graph illustrating the relationship between a number of brake operations and an amount of adjustment with respect to different configurations of an automatic parking stroke adjustment device.

Referring to FIG. 6, as is understood from the above-provided explanation of the adjustment operation, since the automatic shoe clearance adjustment device functions as an exponential incremental characteristic in which the amount of adjustment becomes large when the clearance between the brake drum and the brake shoe 10 is large while an amount of adjustment becomes small when the clearance is small, the automatic shoe clearance adjustment device is effective in preventing an over adjustment during heavy use of the brake. In addition, since the automatic adjustment mechanism is built into the hydraulic chamber 30d, it is especially suitable for a motor vehicle that typically is overused, such as, for example, a dump truck or a truck mixer.

Automatic Parking Stroke Adjustment Operation

Referring now to FIGS. 1 and 4, the adjustment operation of the automatic parking stroke is explained below.

If the service brake is to be operated after the linings 10c, 11c of the brake shoes 10, 11 have worn out, the first strut 60 and the second strut 70 move together, toward the right, with the brake shoe 11. Meanwhile, the brake lever 50 and pivot lever 40 rotate counterclockwise. The brake lever 50 is moved by the spring force of the springs 63, 71, while the pivot lever 40 rotates with the pivot section (the hollow protuberance 41) as the fulcrum.

Accordingly, the bell crank lever 62 moves to the right together with the plate 61, and the upper portion of the pivot lever 40 moves to the left an amount corresponding to its rotation and an amount of the brake shoe 10 movement. As a result, the bell crank lever 62 is rotated clockwise with the pin 65 as the fulcrum. Small teeth 62b of the bell crank lever 62 that are engaging small teeth 61b of the plate 61 are shifted by one pitch to automatically extend the overall length of the first strut 60 while a stroke of the brake lever 50 is kept constant.

As is understood from the above-described adjustment operation, regardless of the clearance amount between the brake drum and the brake shoes 10, 11, the adjustment operation of this invention functions as a one-shot adjusting characteristic, as is shown in FIG. 6, to provide a determined amount of clearance for one service brake operation by facilitating the adjustment operation.

In addition, since the first and the second struts 60, 70 may be designed to be plate-shaped, a space around the brake center may be designed larger, thereby facilitating use of this invention in a smaller diameter brake which is impractical for the conventional parking brake.

Here, a matter of concern is that an adjustment convergence value of the automatic shoe clearance adjustment device and the automatic parking stroke adjustment device is set so that the brake shoes 10, 11 are to be supported by fixed anchor mechanisms 33, 34, which components of the service brake actuators 30, 31 while not in operating as a brake. This makes sure that dragging or biting of the brake shoes 10, 11 is prevented while driving on a rough road.

Embodiment 2

Figure 7:
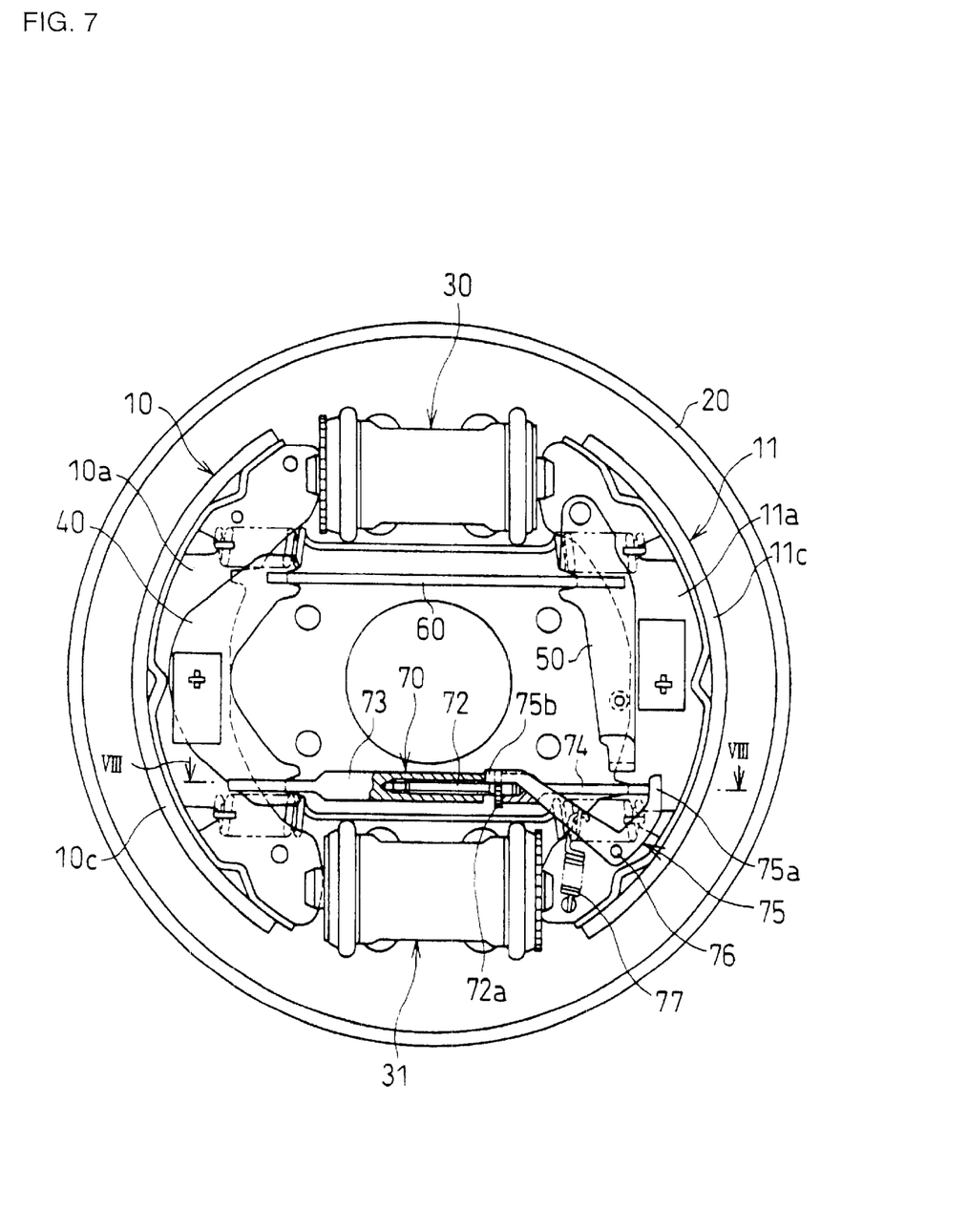
FIG. 7 is a plan view of duo two leading type drum brake device with respect to a second embodiment according to this invention.
Figure 8:
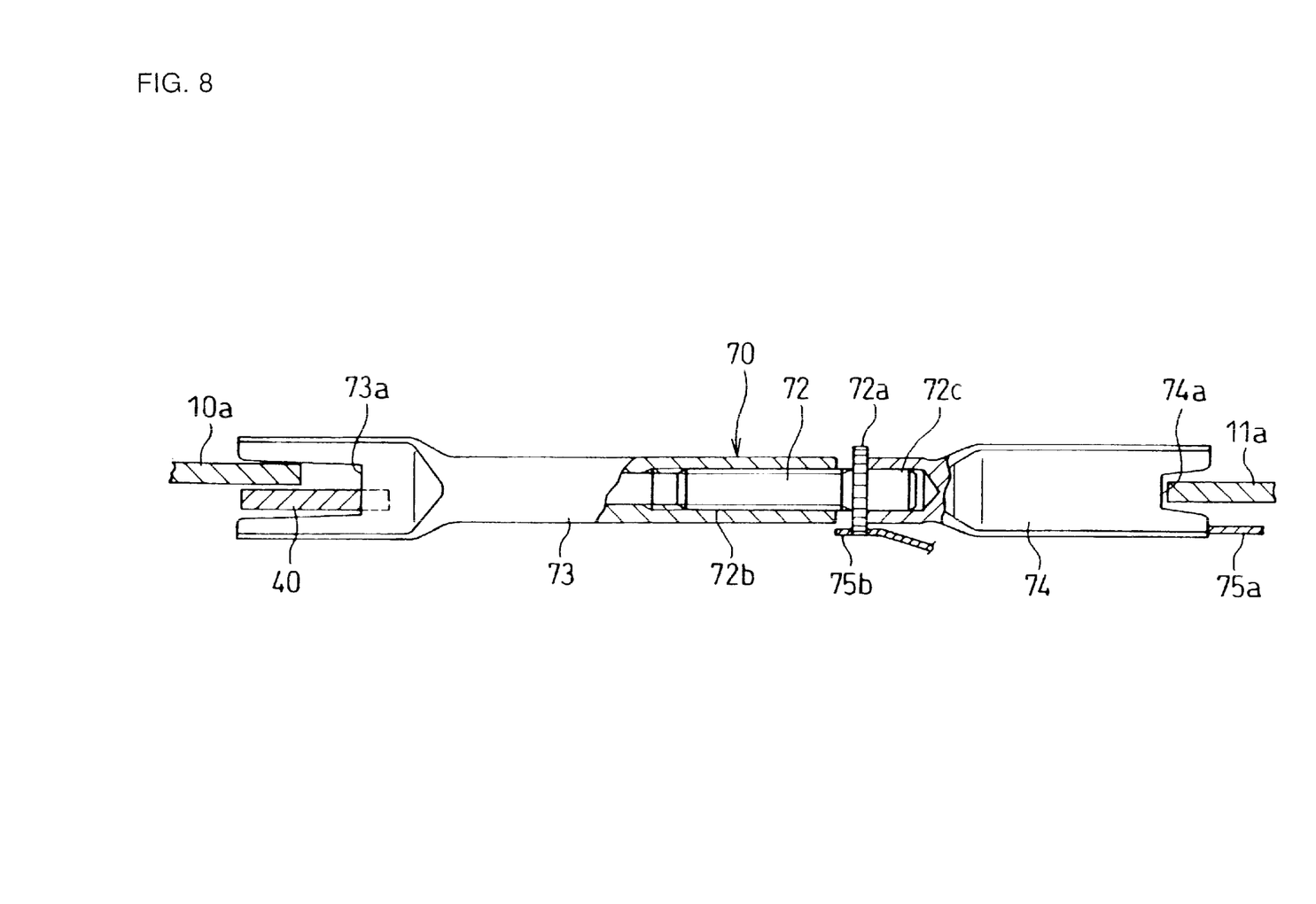
FIG. 8 is a cross-sectional view of the drum brake device illustrated in FIG. 7 taken along section line VIII—VIII.

A second embodiment of this invention is explained below with reference to FIGS. 7–8. Like reference numerals are provided for corresponding parts described above with respect to first embodiment above. Also, explanation of such parts is omitted herefrom to avoid redundancy.

The above description of the first embodiment explains the case when the automatic parking stroke adjustment device is provided in the first strut 60. However, the automatic parking stroke adjustment device may be provided in the second strut 70 as shown in FIGS. 7–8.

The second embodiment provides the automatic parking stroke adjustment device with a linear incremental adjusting characteristic, see FIG. 6, used in the second strut 70. According to the second embodiment, since an amount that needs to be adjusted per cycle is minimized, a stroke variance of the parking lever due to the linings 10c, 11c wearing out is minimized, which provides more a comfortable operation feeling to the driver.

The second strut 70 comprises an adjustment bolt 72, an adjustment nut 73, and an adjustment sleeve 74. Adjustment teeth 72a are integrally formed on the central region of the adjustment bolt 72. A male, or external, thread shaft 72b is screwed into the adjustment nut 73, and a shaft 72c rotatably fits into the adjustment sleeve 74.

An outer end of the adjustment nut 73 where a notched groove 73a is formed is plate-shaped. Also, an outer end of the adjustment sleeve 74 where the notched groove 74a is formed is also plate-shaped. Further, as shown in FIG. 7, the lower end of the pivot lever 40 abuts against a bottom of the notched groove 73a where the shoe web 10a is received. The bottom of the notched groove 74a engages an inner end surface of the shoe web 11a with a slight clearance.

An adjustment lever 75 is rotatably and pivotally supported by a pin 76 on the shoe web 11a. An adjustment spring 77 extends between the adjustment lever 75 and the shoe web 11a and applies a counterclockwise spring force to the adjustment lever 75 with the pin 76 as the fulcrum. Accordingly, one arm 75a of the adjustment lever 75 abuts against the end surface of the adjustment sleeve 74, and the other arm 75b engages with the adjustment teeth 72a.

In addition, the counterclockwise spring force from the adjustment spring 77 is transmitted to move the second strut 70 to the left, rotate the pivot lever 40 clockwise with the pivot section (hollow protuberance 41) as the fulcrum, move the first strut 60 to the right, and rotate the brake lever 50 counterclockwise with its pivot point 51 as the fulcrum.

Therefore, if the linings 10c, 11c of both brake shoes 10, 11 are worn out, an amount of opening of both brake shoes 10, 11 during operation of the service brake increases. Also, when an amount of rotation of the other arm 75b with a pivot point at the pin 76 of the adjustment lever 75 exceeds one pitch of the adjustment teeth 72a, the adjustment bolt 72 is rotated to extend the entire length of the second strut 70 one pitch to maintain an operation stroke of the brake lever 50 constant.

Embodiment 3

Figure 9A:
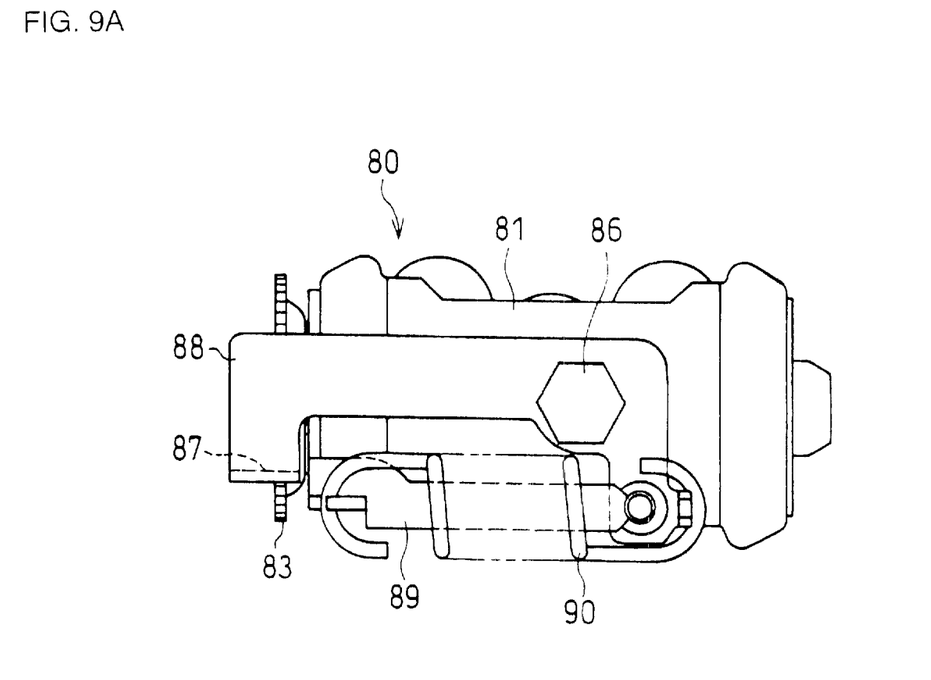
FIG. 9A is a plan view of the service brake actuator with externally mounted linear incremental automatic shoe clearance adjustment device with respect to a third embodiment according to this invention.
Figure 9B:
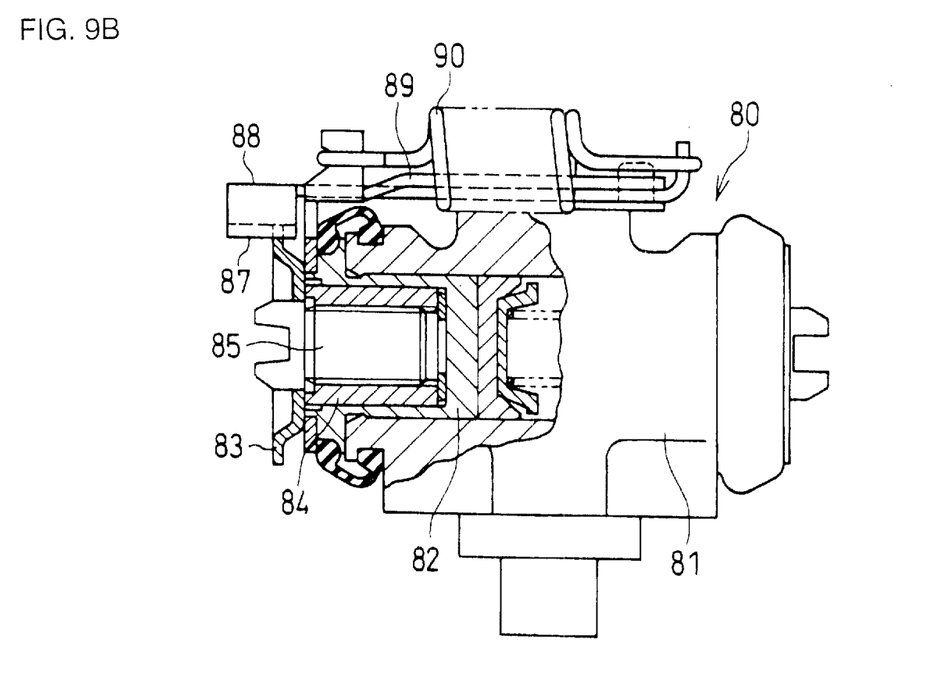
FIG. 9B is a partial broken side view of the service brake actuator illustrated in FIG. 9A.

Referring to FIGS. 9A–B, yet another embodiment of this invention is illustrated. The service brake actuator 80 using an automatic shoe clearance adjustment device with a linear incremental adjusting characteristic is publicly disclosed in Japanese Patent Application Laid-Open-No. 8-312702.

The automatic shoe clearance adjustment device comprises an adjustment nut 84 rotatably fitting in a piston 82 housed in a cylinder body 81 and having adjustment teeth 83 fixed on its peripheral end. An adjustment bolt 85 is screwed into the adjustment nut 84 and has a notched groove formed on its outer side to receive the shoe web 10a. An adjustment lever 88 is rotatably and pivotally supported with a shaft 86 outside the cylinder body 81 and has an adjustment folk 87 engaging the adjustment teeth 83. A connecting part 89 passes an advancement of the piston 82 to an adjustment lever 88. An adjustment spring 90 extends between the connection part 89 and the adjustment lever 88. Engagement of the adjustment folk 87 and the adjustment teeth 83 is designed to have a ratchet mechanism allowing rotation in only one direction.

In this embodiment, the anchor structure comprises the piston 82 and the cylinder body 81 with the flange portion of the piston 82 abutting an end surface of the cylinder body 81.

In the above described structure, if the lining 10c wears out while operating the service brake and a clearance between the lining 10c and the brake drum reaches a predetermined amount, the connecting part 89 integrated with the piston 82 advances, a tension of the adjustment spring 90 applies a clockwise rotating force, with the shaft 86 as the center, to the adjustment lever 88, and the adjustment folk 87 rotates one pitch of the adjustment teeth 83. Accordingly, a shoe clearance is automatically adjusted by screwing the adjustment bolt 85 out of the adjustment nut 84.

The above description is made for the case where a shoe clearance is automatically adjusted when the piston 82 advances. However, the same automatic adjustment may be conducted when the piston 82 strokes backward.

Embodiment 4

Figure 10:
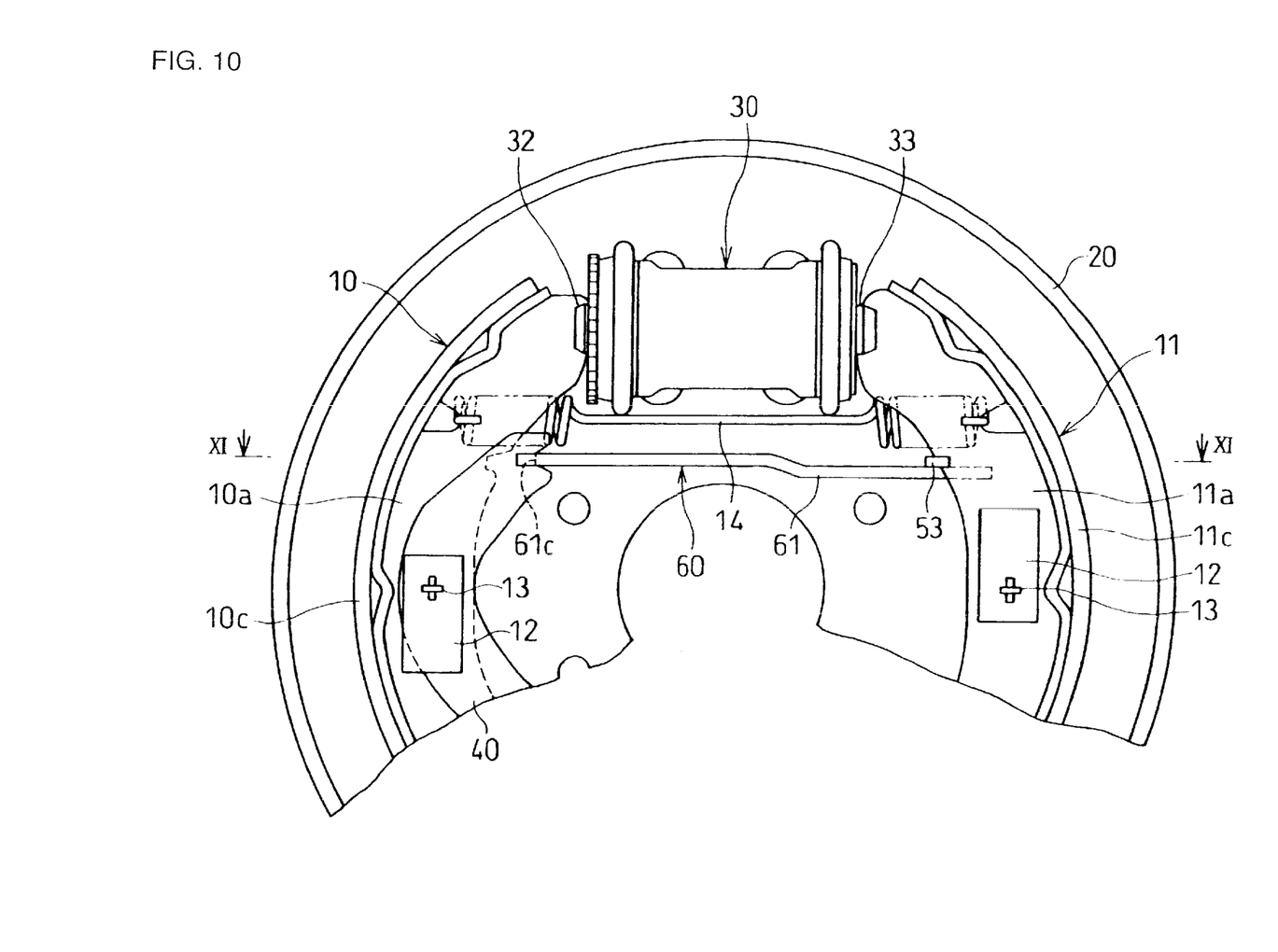
FIG. 10 is a partial plan view of duo two leading type drum brake device with a cross-pull parking brake with respect to a fourth embodiment according to this invention.
Figure 11:
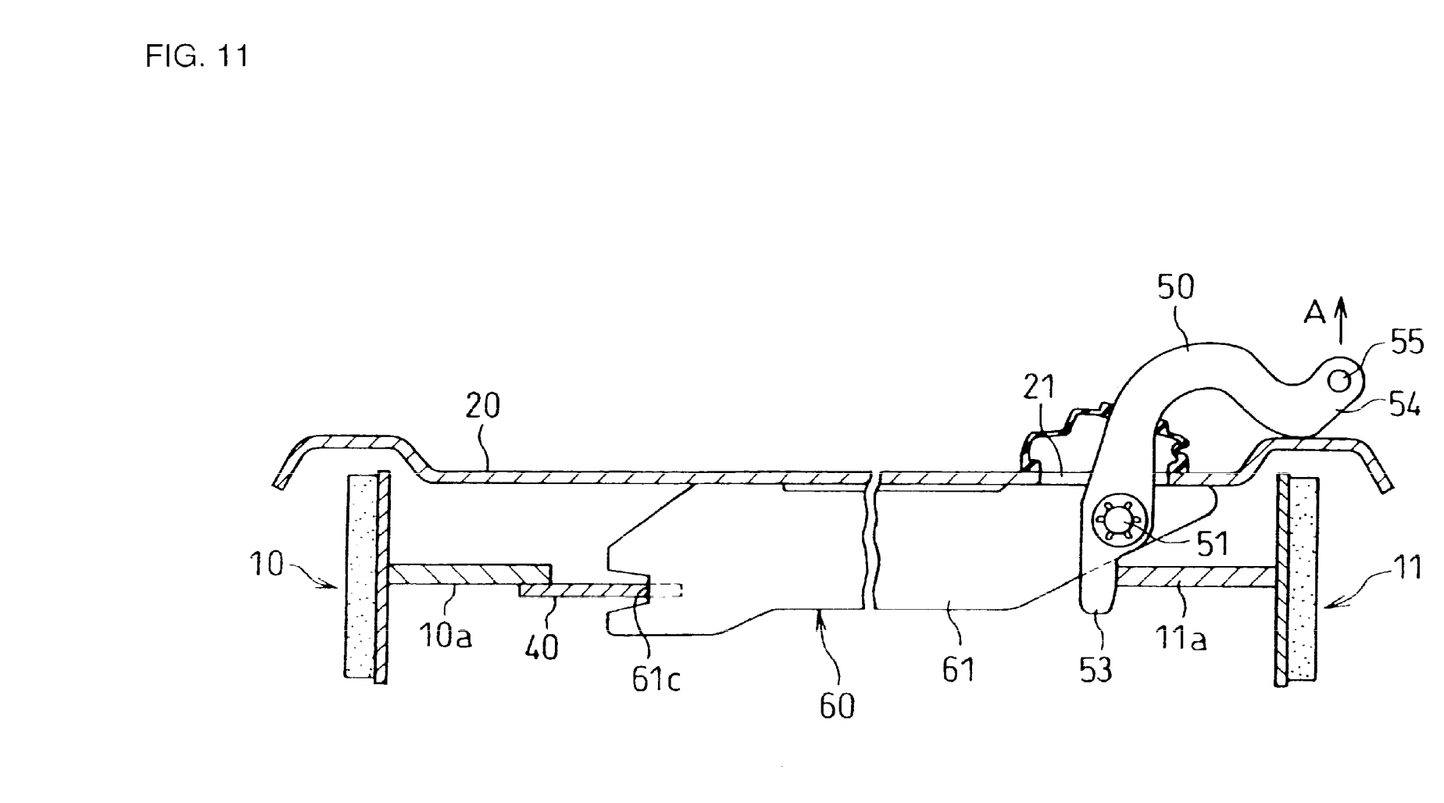
FIG. 11 is a cross-sectional view of the drum brake illustrated in FIG. 10 taken along section line XI—XI.
Figure 12:
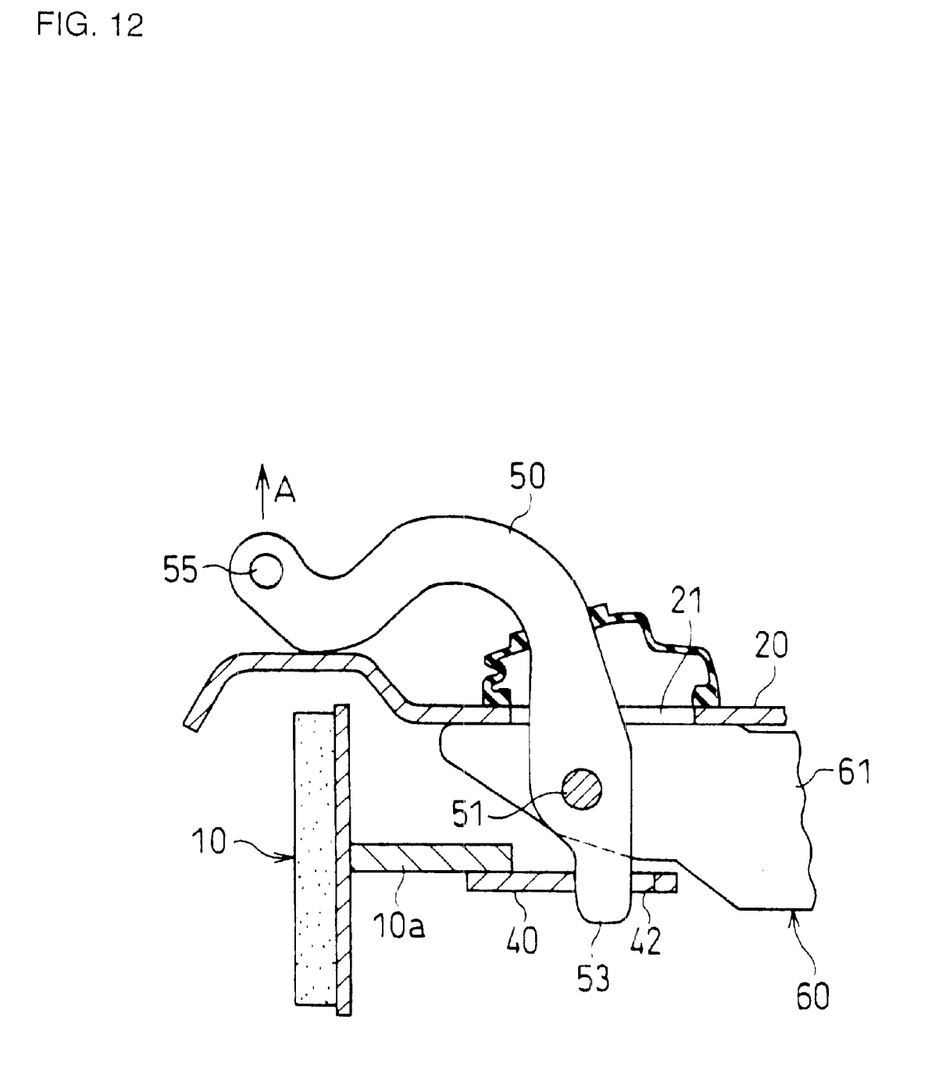
FIG. 12 is a cross-sectional view of the drum brake illustrated in FIG. 10 with the brake lever provided on the left side of the plate.

FIGS. 10–12 illustrate yet another embodiment of this invention that uses a cross-pull parking brake actuator.

Referring to FIG. 10, a notched groove 61c is formed at an end of plate 61. The plate 61 corresponds to the first strut 60. The notched groove 61c abuts an upper portion of the pivot lever 40. As illustrated in FIG. 11, a substantially L-shaped brake lever 50 is rotatably and pivotally supported by the pin 51 at the other end of the plate 61, and a finger-shaped portion 53 of the brake lever 50 abuts against the inner end surface of the shoe web 11a.

An arm 54 of the brake lever 50 protrudes out of the brake through a hole 21 of the back plate 20. A portion of the arm 54 abuts against the back plate 20 to restrict the retract position of the brake lever 50. In addition, a pair of brake shoes 10, 11 open by pulling a cable connecting hole 55 via a parking brake cable (not shown) at an almost right angle to the back plate 20, in the direction of arrow A. That is, a finger-shaped portion 53 of the brake lever 50 pushes out the brake shoe 11 to the right, and the plate 61 moves to the left by the reaction force via the pin 51. The remainder of the explanation of the operation is omitted herefrom as it is similar to the above-described operation of the second embodiment.

FIG. 12 shows another example where the brake lever 50 is provided at the left end of the plate 61 in FIG. 10. When the brake lever 50 is provided at the left end of the plate 61, the finger-shaped portion 53 of the brake lever 50 abuts against the upper portion of the pivot lever 40. As shown in FIG. 10, the finger-shaped portion 53 pierces through a rectangular hole 42 formed at the upper portion of the pivot lever 40. Alternatively, a notched groove may be formed on the upper portion of the pivot lever 40 and the finger-shaped portion 53 may abut against the bottom in the groove.

While there has been illustrated and described what is at present considered to be preferred embodiments of this invention, it will be understood by those skilled in the art that various changes and modifications may be made, and equivalents may be substituted for elements thereof without departing from the scope of this invention. For example, the various above-described configurations of adjustment may be applicable in an automatic shoe clearance adjustment device and an automatic parking stroke adjustment device. Further, an automatic parking stroke adjustment device may be a kind which adjusts during operation of the parking brake. In addition, a variety of modifications may be considered, for example, the position of the brake lever 50 may be reversed or turned upside down, i.e., the lower portion locating at the second strut 70 side. Therefore, it is intended that this invention not be limited to the particular embodiments disclosed herein, but include all embodiments within the spirit and scope of this disclosure.

What is claimed is:

1. A duo two leading type drum brake device, comprising:
   a back plate;
   a pair of service brake actuators;
   a pair of brake shoes that face each other on said back plate and have a service brake actuator of said pair of service brake actuators between each pair of adjacent ends of said pair of brake shoes;
   an automatic shoe clearance adjustment device, which extends itself in response to an excessive opening of each of said first and second brake shoes upon operation of a service brake and automatically adjusts a clearance between a brake drum and each of said first and second brake shoes, that is provided in each service brake actuator of said pair of service brake actuators; wherein
   a pivot lever that is rotatably supported longitudinally at a central region of a first brake shoe of said pair of brake shoes;
   a first strut is provided between a first end of said pivot lever and a second brake shoe of said pair of brake shoes:
   a second strut parallel to said first strut is provided between a second end of said pivot lever and said second brake shoe;
   a parking brake actuator comprising of a brake lever and positioned so as to activate a link mechanism that includes said pivot lever and said first and second struts, upon operation of a parking brake, spread open said pair of brake shoes through an engagement with said link mechanism; and
   an automatic parking stroke adjustment device, which extends in response to an excessive opening of both of said first and second brake shoes and automatically adjusts a stroke amount of said parking brake actuator, is provided on at least one of said first and second struts.

2. The duo two leading type drum brake device according to claim 1, wherein each adjustment convergence value of said automatic shoe clearance adjustment device and said automatic parking stroke adjustment device is set to support each adjacent end of said pair of brake shoes by an anchor of said service brake actuator when said service brake is not operating.

3. The duo two leading type drum brake device according to claim 1, wherein said automatic shoe clearance adjustment device has a built-in screw mechanism comprising a bolt and a nut and is housed in a cylinder of said service brake actuator.

4. The duo two leading type drum brake device according to claim 3, wherein said screw mechanism further comprises a reversible screw threaded connection wherein said bolt and said nut are rotatable and said automatic shoe clearance adjustment operation features an exponential incremental characteristic.

5. The duo two leading type drum brake device according to claim 1, wherein said automatic shoe clearance adjustment device uses a ratchet mechanism comprising a retrofit lever mounted outside of said cylinder body of said pair of service brake actuators and a gear.

6. The duo two leading type drum brake device according to claim 5, wherein said automatic shoe clearance adjustment operation of said ratchet mechanism of said retrofit lever and said gear features a linear incremental characteristic function.

7. The duo two leading type drum brake device according to claim 1, wherein said automatic parking stroke adjustment device has a linear incremental adjusting function comprising a screw mechanism of a bolt and a nut.

8. The duo two leading type drum brake device according to claim 1, wherein said automatic parking stroke adjustment device has a one-shot adjusting function comprising teeth formed on a bell crank lever and elements engaging with said teeth.

9. The duo two leading type drum brake device according to claim 1, wherein said parking brake actuator operates parallel to said back plate.

10. The duo two leading type drum brake device according to claims 1, wherein said parking brake actuator operates at a right angle relative to said back plate.

11. The duo two leading type drum brake device according to claim 1, further comprising a protuberance integrally formed by pressing longitudinally on a central region of either one of said pivot lever and said first and second brake shoes, wherein said protuberance is rotatably and pivotally supported in an associated hole provided on either one of said first and second brake shoes and said pivot lever without said protuberance.

12. The duo two leading type drum brake device according to claim 11, wherein said protuberance is a hollow protuberance formed as a burr with a press and a brake shoe holding pin freely pierces through said hollow protuberance.

* * * * *